United States Patent [19]

Willburger

[11] Patent Number: 4,692,830
[45] Date of Patent: Sep. 8, 1987

[54] CLEANING CASSETTE FOR HIGH SPEED CASSETTE RECORDERS INCLUDING MANUALLY OPERABLE DRIVE MEANS

[76] Inventor: Ulrich Willburger, Auf der Schuchen 27, 8110 Seehausen, Fed. Rep. of Germany

[21] Appl. No.: 623,147

[22] Filed: Jun. 21, 1984

[30] Foreign Application Priority Data

Jun. 22, 1983 [DE] Fed. Rep. of Germany ... 8318007[U]

[51] Int. Cl.[4] .................. G11B 5/10; G11B 5/127; G11B 5/41
[52] U.S. Cl. .................. 360/128; 15/DIG. 12
[58] Field of Search .................. 360/128, 132, 137; 15/DIG. 12, DIG. 13

[56] References Cited

U.S. PATENT DOCUMENTS

| 3,439,922 | 4/1969 | Howard | 274/47 |
| 4,006,493 | 2/1977 | Gerry | 360/132 |
| 4,462,553 | 7/1984 | Hashimoto | 360/128 |
| 4,470,089 | 9/1984 | Hutchins et al. | 360/128 |
| 4,490,761 | 12/1984 | Wolynski et al. | 360/128 |
| 4,498,113 | 2/1985 | Clausen et al. | 360/128 |

FOREIGN PATENT DOCUMENTS 8401657 4/1984 Sweden.
1243277 8/1971 United Kingdom.

Primary Examiner—Robert S. Tupper
Assistant Examiner—Melissa J. Koval
Attorney, Agent, or Firm—Steele, Gould & Fried

[57] ABSTRACT

A cleaning cassette for high speed cassette records has a cassette case dimensioned to correspond to a magnetic tape cassette operative in the particular recorder, a cleaning tape guided in the cassette case, the cleaning tape movable from a supply reel to a take-up reel across an area corresponding to a magnetic head of the cassette recorder. The take-up reel remains accessible when the cleaning cassette is in place, defining a manually-operable drive means for manual transfer of the cleaning tape from the supply reel to the take-up reel during cleaning. The cleaning tape is manually passed over the heads at a slower speed than an operative speed of the magnetic tape cassette for better cleaning and less head damage.

14 Claims, 10 Drawing Figures

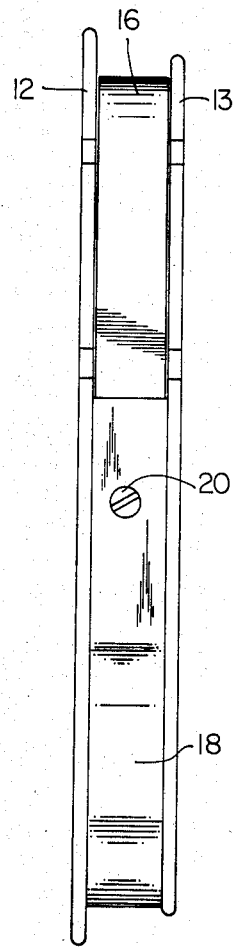
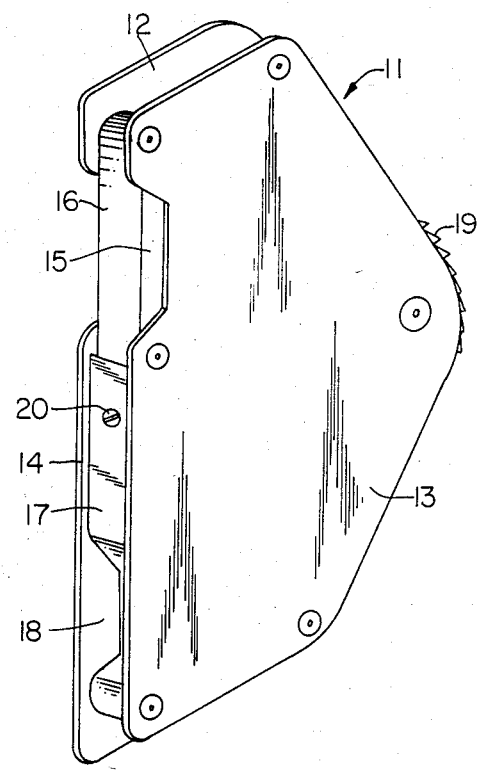
FIG. 2
FIG. 1

CLEANING CASSETTE FOR HIGH SPEED CASSETTE RECORDERS INCLUDING MANUALLY OPERABLE DRIVE MEANS

BACKGROUND OF THE INVENTION

1. Field of the Invention

The invention relates to a cleaning cassette for high-speed cassette recorders, with a cassette case corresponding to the associated magnetic tape casette case and a cleaning tape housed therein, which at least partly has roughly the same configuration as the magnetic tape of the magnetic tape cassette.

2. Prior Art

It is known in connection with commercial cassette recorders, for example those used as accessories for small computers, to use cleaning cassettes for cleaning the magnetic heads. These cleaning cassettes have the same configuration as the magnetic tape cassettes belonging to the particular cassette recorder. Thus, the cleaning tape is also driven with the aid of the magnetic tape cassette drive.

Magnetic tape recorders have now been developed for computer uses, in which the magnetic tape housed in the magnetic tape cassettes is moved past the magnetic head at a very high speed, i.e. at more than 2 m/sec. At such high speeds, an air cushion is formed between the magnetic tape and the magnetic head, so that dust can collect there when the tape recorder is in operation. After prolonged use, this dust leads to the gap between the magnetic head and the magnetic tape becoming so large that reliable recording or playback is no longer possible. Moreover, due to the high speed, there is marked electrostatic charging, which helps to attract further dust particles.

It is not possible in the case of such high speed tape recorders to use cleaning cassettes which are driven by the magnetic tape with the cassette drive mechanism, because this would lead to excessively high speeds of the cleaning tape, which would then act in the manner of an abrasive tape.

SUMMARY OF THE INVENTION

It is an object of the invention to provide a cleaning cassette for high speed cassette recorders, which make it possible to clean the magnetic heads in problem-free manner.

In order to achieve its objects, the present invention proposes a cleaning cassette for high speed cassette recorders, with a cassette case corresponding to the associated magnetic tape cassette case, and a cleaning tape guided therein from a supply reel to a take-up reel and which at least in its area applied to a magnetic head has roughly the same configuration as the magnetic tape in the magnetic tape cassette. The cleaning cassette has a manually operable drive means for the manual transfer of the cleaning tape. This construction permits a correct cleaning of the magnetic head, even in the case of high speed cassette recorders, without there being any risk of damage or inadequate cleaning. The cleaning cassette case can be designed in such a way that projections or the like provided on magnetic tape cassettes for operating means on the tape recorder are not present on the cleaning cassettes.

According to a further development, the cleaning cassette has a rewind stop. This is intended to prevent the reuse of a cleaning tape which has already been used and which would lead to the redepositing of dirt which had been removed.

According to another feature of the invention, the drive means can have a peripherally knurled roller or the like. It is particularly advantageous if the drive means has a peripherally knurled take-up reel. In particular, the two flanges of the reel enclosing the core section can be peripherally knurled. The knurled take-up reel can, for example, be arranged at one corner of the case, so that a relatively large area of its periphery is accessible from the outside.

According to a further development, the rewind stop is formed by a spring-loaded pawl cooperating with the peripheral knurling. Thus, the peripheral knurling is simultaneously used for a further function, namely for locking aginst a reverse rotation. It is particularly favourable if the pawl is formed by a cantilever leaf spring. In this case, the free end of said leaf spring can engage roughly tangentially on the knurled part of the cleaning cassette, so that even a weak rewind stop can be used.

According to a further development of the invention the cleaning tape is held taut by a tensioning member. The tensioning member is preferably located immediately after the cleaning tape supply reel, the cooperation between the tensioning member and the rewind stop leading to a taut guidance of the cleaning tape.

BRIEF DESCRIPTION OF THE DRAWINGS

Further features, details and advantages of the invention can be gathered from the following description of a preferred embodiment of the invention with reference to the drawings, wherein show:

FIG. 1 a perspective view of a cleaning cassette according to the invention.

FIG. 2 a view of the cassette from the front left of FIG. 1.

Figure 3:
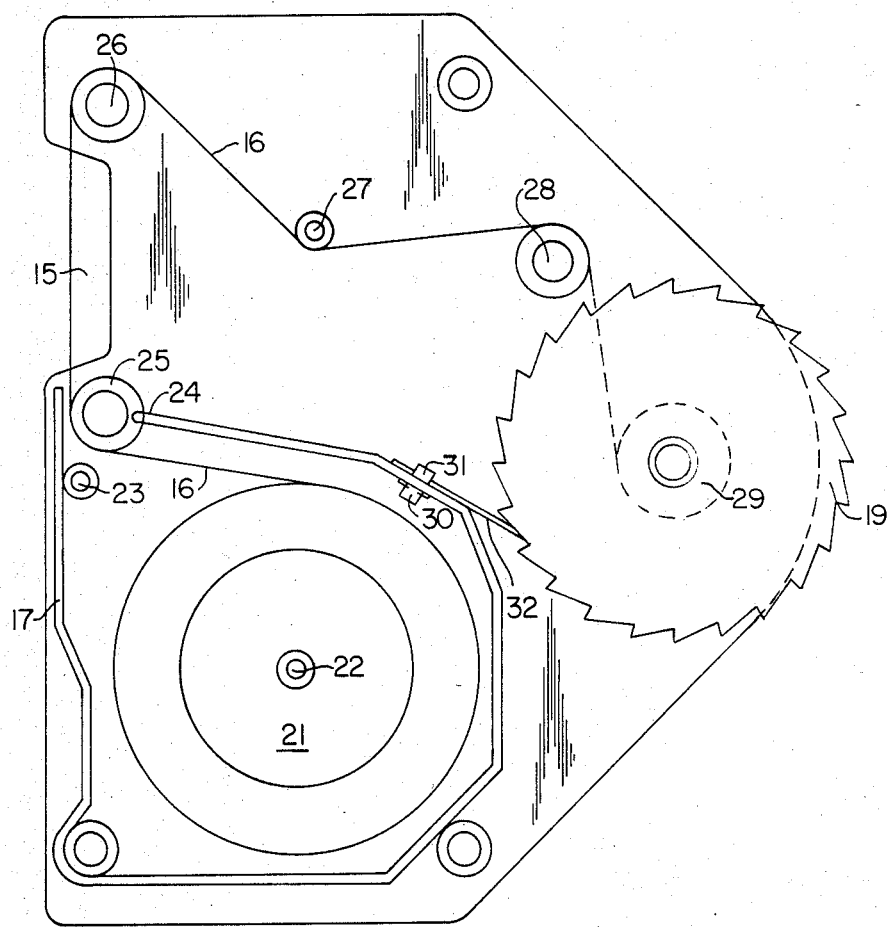
FIG. 3 a plan view of the cassette from the front right of FIG. 1 with the cover plate removed.

The case 11 of the cleaning cassette shown in FIG. 1 contains a base plate 12, which is directed to the left and rear in FIG. 1, as well as a cover plate 13, which can be screwed to one another with the aid of rollers or bolts. Base plate 12 and cover plate 13 have roughly the same shape, the cover plate 13 being somewhat smaller than the base plate, as can be particularly gathered from FIG. 2.

Base plate 12 and cover plate 13 have a slot 15 on the cleaning cassette end face 14 directed towards the magnetic head. In the vicinity of the slot, cleaning tape 16 comes to rest outside the case, so that contact is possible in this area between the magnetic head to be cleaned and the cleaning tape 16. Cleaning tape 16 is preferably formed from a nonwoven, lint-free cotton tape.

Below slot 15 in FIG. 1, cassette case 11 is closed by a cover 17, which forms a closed space for the supply reel of cleaning tape 16. Cover 17 is inwardly displaced in the lower area 18 of case 11, because with respect to the associated magnetic tape cassettes, said part of the case operates a pushbutton and this must not take place when using the cleaning cassette.

At the side directed to the right and rear in FIG. 1 can be seen the periphery of a grooved take-up reel 19. The cleaning cassette operator can act on said reel 19 in order to pass a corresponding cleaning tape length past the magnetic head as a result of a few turns.

FIG. 2 shows that the base plate 12 to the left is somewhat larger than the cover plate 13 to the right. It can also be seen that cover 17 is screwed down with the aid of a screw 20. The short strip of cleaning tapes 16 can also be seen in FIG. 2. It can also be gathered therefrom that the cleaning cassette case 11 has no parts which project beyond the planes of the base and cover plates.

FIG. 3 shows a plan view of the cleaning cassette from the right, cover plate 13 being removed. It can be seen that the cleaning tape is wound on to a supply reel 21, which is arranged in rotary manner about a pivot or pin 22. Cover 17 is passed round the supply reel 21, its left-hand, upper end being screwed with screw 20 shown in FIGS. 1 and 2 to a pin or pivot 23, whilst the right-hand end 24 thereof engages in an axial slot in a tensioning member 25. This axial slot not only holds and secures the right-hand end 24 of cover 17, but also prevents rotation of tensioning member 25. Cleaning tape 16 is guided from the supply reel via tensioning member 25 and through slot 15 via a further guide pulley 26. From the latter, cleaning tape 16 passes over the next pivot or pin 27 and a further guide pulley 28 to the take-up reel 19, where the free end of the cleaning tape 16 is fixed and more particularly bonded to core 29 of reel 19.

A leaf spring 32, made from a hard spring strip, is screwed with the aid of a screw 30 and a nut 31 to the right-hand cover 17, which is bent in polygonal manner in the drawing. Leaf spring 32 engages under an acute angle on the outer circumference of take-up reel 19. The outer circumference of reel 19 is provided with a knurling, which is not apparent from the drawing, leaf spring 32 acts as a rewind stop, so that reel 19 can only turn counterclockwise in FIG. 3. A counterclockwise roation of take-up reel 19 leads to the cleaning tape 16 being wound on to core 29 of reel 19, so that a few rotary movements of said reel leads to a certain amount of cleaning tape 16 being moved through slot 15. Due to the arrangement of tensioning member 25, cleaning tape 16 is held taut in slot 15.

All the pins and rollers are mounted both in base plate 12 and in cover plate 13, the wider rollers and/or pins being used for screwing the base plate to the cover plate. As a result the cleaning cassette has a sufficiently high mechanical stability. the screw joints can be advantageously replaced by riveted joints, which simplifies manufacture.

The normal storage cassettes of high speed magnetic tape recorders have a tape width of 6.4 mm. The width of the cleaning tape is advantageously greater, so that this always ensures that the magnetic head is cleaned, independently of its set height. The tape width is preferably 10 to 15 mm, particularly approximately 12 mm ($\frac{1}{2}$ inch).

Figure 4:
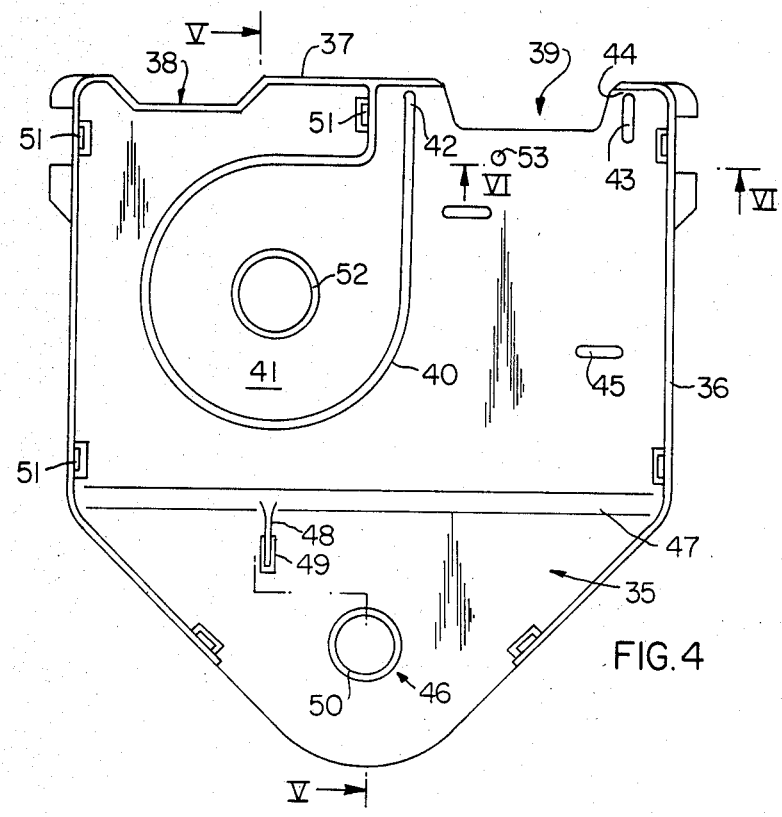
FIG. 4 a plan view of a base plate of a lateral embodiment.

FIG. 4 is a plan view of base plate 35 of another embodiment. This veiw roughly corresponds to that of FIG. 3, but for simplification reasons the course of the cleaning tape is not shown. Base plate 35 is substantially flat and along its edge has an upwardly directed flange 36, which forms the side walls of the case of the second embodiment. Flange 36 is shaped in one piece to the base plate 35 and the entire base plate is made from plastic. The upper face 37, which enters the cassette recorder and faces the magnetic head, has a first depressed area 38, which prevents engagement with an operating member of the tape recorder. The second recessed area 39 of face 37 serves to ensure that the cleaning tape can engage with the magnetic head, cf. also FIG. 3. When the cleaning cassette is inserted in the tape recorder, the magnetic head (and optionally the erase head) is located in this area. A boundary wall 40 is also in one piece with base plate 35 and flange 36 and has a circular shape over roughly $\frac{3}{4}$ of its circumference and forms an inner space 41 for receiving a supply reel for the textile, non-woven cleaning tape. At its right-hand, upper end 42, boundary wall 40 ends shortly before face 37 and forms a narrow passage there through which the cleaning tape can be guided to the right from inner space 41. To the right of the recessed area 39, base plate 35 has a bar 43, which forms a narrow passage 44 opposite to edge 36 and the cleaning tape can easily be moved to the right through the same. Base plate 35 has a further bar 45, which is also used for deflecting the cleaning tape in the direction of the take-up reel holder 46.

Figure 5:
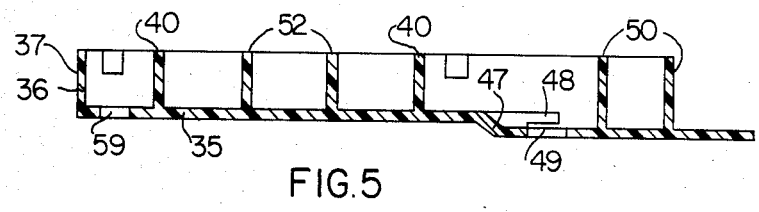
FIG. 5 a section roughly along line V—V of FIG. 4.

On the side of boundary wall 40 remote from face 37, base plate 35 has a step, as can be more clearly gathered from FIG. 5. In the vicinity of step 47, a resilient tongue 48 is shaped in one piece on to base plate 35 and in the vicinity thereof plate 35 has a rectangular hole 49. Hole 49 is used for making it easier to manufacture tongue 48 in one piece with base plate 35.

On the other side of step 47, base plate 35 is roughly shaped like an isosceles right-angled triangle with a rounded apex. Roughly in the centre of this triangle is arranged a holder 46 for a supply reel which comprises a hollow cylindrical annular shoulder 50, which is also in one piece with base plate 35.

In the vicinity of cylindrical shoulder 50 there is no longer any flange 36, so that here base plate 35 does not form an edge for the case.

Figure 6:
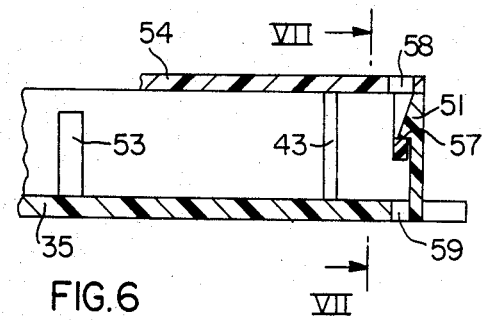
FIG. 6 a larger scale section along line VI—VI of FIG. 4 with the cover fitted.

On the inside of flange 36 is provided a plurality of inwardly directed projections 51, whose shape can be gathered from FIG. 6. One of these projections 51 is shaped in the upper area of boundary wall 40. In the inner space 41 within the boundary wall 40 is also shaped in one piece a hollow cylindrical extension 52, which serves as a mounting support for the cleaning tape supply reel. Below the recessed area 39 is provided a cylindrical pin or pivot 53, on which can be mounted a pressure roller, which presses the cleaning tape against the magnetic head.

FIG. 5 shows the one piece nature of base plate 35, flange 36, boundary wall 40 and cylindrical extensions 50, 52. It is also possible to see projection 51 on boundary wall 40 and another projection 51 on flange 36.

On the other side of step 47, base plate 35 is somewhat lower than in the remaining area, the dimensions being selected in such a way that the area in FIG. 5 from the left to step 47 roughly corresponds to the size of a normal magnetic tape cassette. The tape recorders are constructed in such a way that on inserting a cassette therein it is located in the recorder up to this area, whilst the part to the right of step 47 in FIG. 5 is located outside the recorder.

Figure 7:
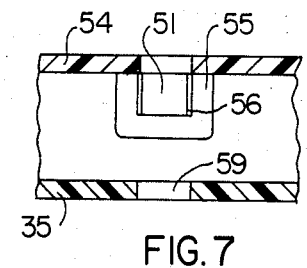
FIG. 7 a section roughly along line VII—VII of FIG. 6.

FIG. 6 shows a partial section along line VI—VI of FIG. 4 with the cover 54 fitted. Cover 54 is also made from plastic and has on its bottom, i.e. the side directed towards the inside of the case, roughly U-shaped extensions 55, cf. FIG. 7. The dimensions of the U-shaped extensions 55 are selected in such a way that the projections 51 on the inside of flange 36 or boundary wall 40 can engage in the inner opening 56 of the U-shaped extensions 55. The shape of projections 51 can be gathered from FIG. 6, which shows that they widen downwards in wedge-shaped manner and form a downwardly directed shoulder 57, which leads to a locking in inner opening 56 of extensions 55 of cover 54. As base plate 35 has a total of seven such projections 51 and cover 54 also has seven extensions 55, there is a reliable locking and securing of cover 54 on base plate 35.

Above the inner opening 56 of extensions 55, the cover again has a hole 58, which is used for the simpler manufacture of extensions 55. The same also applies with regards to the projections 51 on base plate 35, which are also aligned with holes 59 in the latter.

Figure 8:
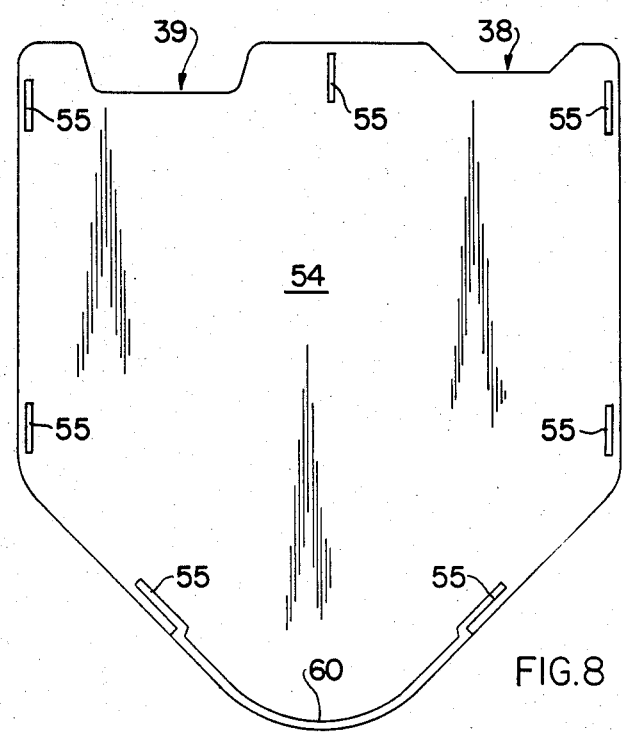
FIG. 8 a view of the cover plate from below.

FIG. 8 shows cover 54 from below and makes it apparent that the extensions 55 are roughly uniformly distributed over the circumference. Three extensions 55 pass in one piece into a flange 60 arranged in the vicinity of the rounded angle, the flange being close to the edge of cover 54, whilst extensions 55 are inwardly displaced with respect to the edge by the thickness of flange 36.

Figure 10:
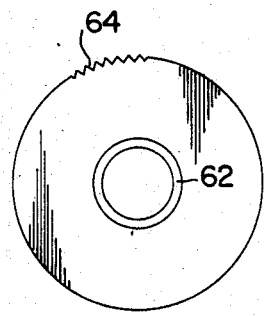
FIG. 10 a diagrammatic view of the take-up reel from the right of FIG. 9.
Figure 9:
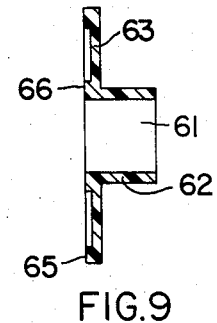
FIG. 9 a section through a take-up reel.

FIG. 9 shows a section through the take-up reel 61, which is mounted on holder 46, which is formed by a cylindrical extension 50, whose external diameter is somewhat smaller than the internal diameter of the cylindrical sleeve 62 of reel 61. To this cylindrical sleeve 62 is connected a disk portion 63, whose outer circumference carries a tooth system 64. Disk portion 63 is depressed on its side remote from sleeve 62, so that only its outer edge area 65 and its inner edge area 66 rest on base plate 35, which reduces friction. In FIGS. 3 and 10, the tooth system 64 is only diagrammatically shown on a small part of the circumference, but in fact it extends over the entire circumference.

The cleaning cassette according to FIGS. 4 to 10 comprises two parts, namely the one-part base plate 35 and the cover 54, the cleaning tape being inserted in base plate 35 and can be wound on to a take-up reel which belongs in inner space 41. The front end of the cleaning tape is fixed to the take-up reel 61 and the latter is mounted on holder 46. Tongue 48 is arranged in such a way that it roughly tangentially engages on tooth system 64 of reel 61 and thus ensures the locking of the latter in one rotation direction. The configuration of the cleaning tape of the embodiment of FIGS. 4 to 10 is much the same as that in the embodiment of FIGS. 1 to 3.

In the case of a cassette recorder, in which the magnetic tape cassette is inserted in another direction, the triangular part can be located at a different point on the cassette.

What is claimed is:

1. A cleaning cassette for a high speed cassette recorder, comprising:
    a cassette case dimensioned to correspond to a magnetic tape cassette operative in the cassette recorder, the cassette case having means preventing the cassette recorder from detecting presence of the cleaning cassette in an operative position of the cassette case, whereby the cassette recorder is inoperative when the cleaning cassette is inserted and operatively movable parts of the cassette recorder are stationary;
    a cleaning tape guided in the cassette case, the cleaning tape being dispensed from a supply reel to a take-up reel, the cleaning tape being guided in the cassette case along a path corresponding to an operative path of a magnetic tape in the magnetic tape cassette, and the cleaning tape being movable over a stationary magnetic head of the cassette recorder, the tape having a configuration similar to the magnetic tape in the area of the magnetic head; and
    a manually-operable drive means for manual transfer of the cleaning tape from the supply reel over the stationary magnetic head to the take-up reel during cleaning, the manually operable drive means being readily accessible for manual operation to advance the tape over the stationary magnetic head when the cleaning cassette is inserted in the operative position, the cassette recorder detecting presence of a cassette by contact with an area of a case thereof, the cassette case of the cleaning cassette being indented at the area of contact;
    whereby full speed operation of the cassette recorder is precluded when the cleaning cassette is in the operative position and manual advancement of the cleaning tape over the stationary magnetic head occurs in a manner identical to cassette operation except at a slower speed.

2. The cleaning cassette according to claim 1, further comprising a rewind stop engaging the take-up reel against rotation opposite a take-up direction, the stop preventing the rearward movement of the cleaning tape; and, a tensioning element bearing against the cleaning tape and restricting advance of the cleaning tape, the tensioning element and take-up reel keeping the cleaning tape taut between them.

3. The cleaning cassette according to claim 2, wherein the drive means has a peripherally knurled roller.

4. The cleaning cassette according to claim 1, wherein the drive means is formed by a peripherally knurled take-up reel.

5. The cleaning cassette according to claim 2, wherein the rewind stop has a pawl spring-loaded against peripheral knurling associated with the take-up reel.

6. The cleaning cassette according to claim 5, wherein the pawl is a tongue-like, cantilever leaf spring.

7. The cleaning cassette according to claim 1, further comprising a tensioning element bearing against the cleaning tape and restricting advance of the cleaning tape, the cleaning tape being held taut between the tensioning member and the take-up reel.

8. The cleaning cassette according to claim 1, wherein the cleaning tape has a width of 7 mm to 15 mm.

9. The cleaning cassette according to claim 1, wherein the cassette case has a plastic base plate with a guiding device and holders for the take-up reel and supply reel, the guiding device and holders being integral with the base plate, and further comprising a plastic cover connectable to the base plate.

10. The cleaning cassette according to claim 9, wherein the plastic cover is connectable with the base plate by means of engaging snap connectors on the cover and the base plate.

11. The cleaning cassette according to claim 9, further comprising a rewind stop having a tongue-like spring element integral with the base part and cooperating with peripheral knurling on the take-up reel, the rewind stop preventing movement of the tape opposite a take-up direction.

12. The cleaning cassette according to claim 1, wherein the cleaning tape is a textile, non-woven tape.

13. The cleaning cassette according to claim 8, wherein the cleaning tape has a width of about one half inch (1.2 mm).

14. The cleaning cassette of claim 5, wherein the pawl is an integral projection of the cassette case.

* * * * *